United States Patent [19]

Shekleton

[11] Patent Number: 4,955,192
[45] Date of Patent: Sep. 11, 1990

[54] CONTAINMENT RING FOR RADIAL INFLOW TURBINE

[75] Inventor: Jack R. Shekleton, San Diego, Calif.

[73] Assignee: Sundstrand Corporation, Rockford, Ill.

[21] Appl. No.: 283,079

[22] Filed: Dec. 12, 1988

Related U.S. Application Data

[63] Continuation-in-part of Ser. No. 291,041, Dec. 28, 1988.

[51] Int. Cl.⁵ .............................................. F23R 3/00
[52] U.S. Cl. .................................... 60/39.36; 60/760; 60/39.83
[58] Field of Search .................. 60/39.36, 759, 760, 60/39.75, 39.83, 722

[56] References Cited

U.S. PATENT DOCUMENTS

| | | | |
|---|---|---|---|
| 3,613,360 | 10/1971 | Howes | 60/39.36 |
| 3,623,318 | 11/1971 | Shank | 60/39.36 |
| 3,928,963 | 12/1975 | Devers et al. | |
| 4,149,824 | 4/1979 | Adamson | |
| 4,411,589 | 10/1983 | Joubert et al. | |
| 4,484,856 | 11/1984 | Patacca | |
| 4,639,188 | 1/1987 | Swadley | |
| 4,648,795 | 3/1987 | Lardellier | |
| 4,705,454 | 11/1987 | Bouiller et al. | |
| 4,794,754 | 1/1989 | Shekleton et al. | 60/760 |

*Primary Examiner*—Louis J. Casaregola
*Assistant Examiner*—Timothy S. Thorpe
*Attorney, Agent, or Firm*—Wood, Phillips, Mason, Recktenwald & VanSanten

[57] ABSTRACT

The large mass of a containment ring for a gas turbine and the cost of the material fabricating the same may be minimized in a gas turbine including a rotor 12 having a radial inflow turbine wheel with blades 14 and a nozzle 50 adapted to direct hot gases at the blades 14 to cause rotation of the rotor 12. An annular combustor 18 for supplying gases to the nozzle 50 is surrounded on its inner and outer sides by a housing including a rear shroud 46 and in turn defines a dilution air outlet 34 just upstream of the nozzle 50. A containment ring 70, 80, 90 is disposed in the dilution air path just upstream of the nozzle 34 so as to be cooled by air flowing therein. As a consequence, the containment ring 70, 80, 90 may be located at a radially inward position to minimize its mass and is adequately cooled so as to allow the use of nonexotic materials in fabricating the same.

12 Claims, 2 Drawing Sheets

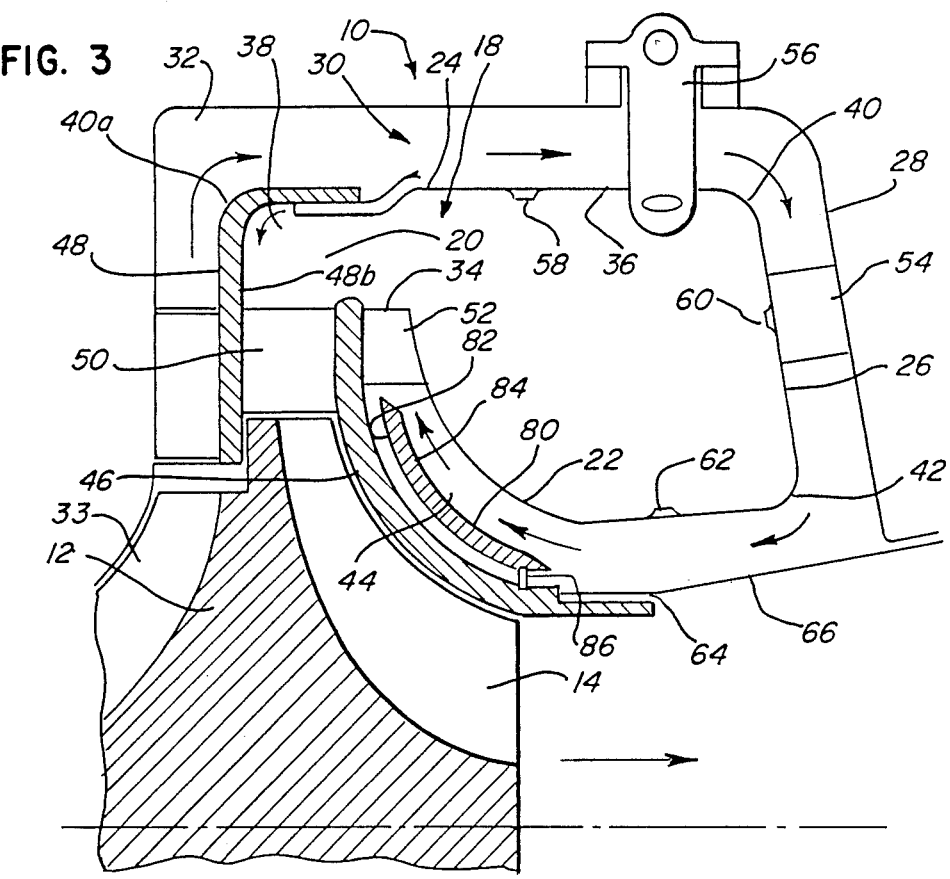
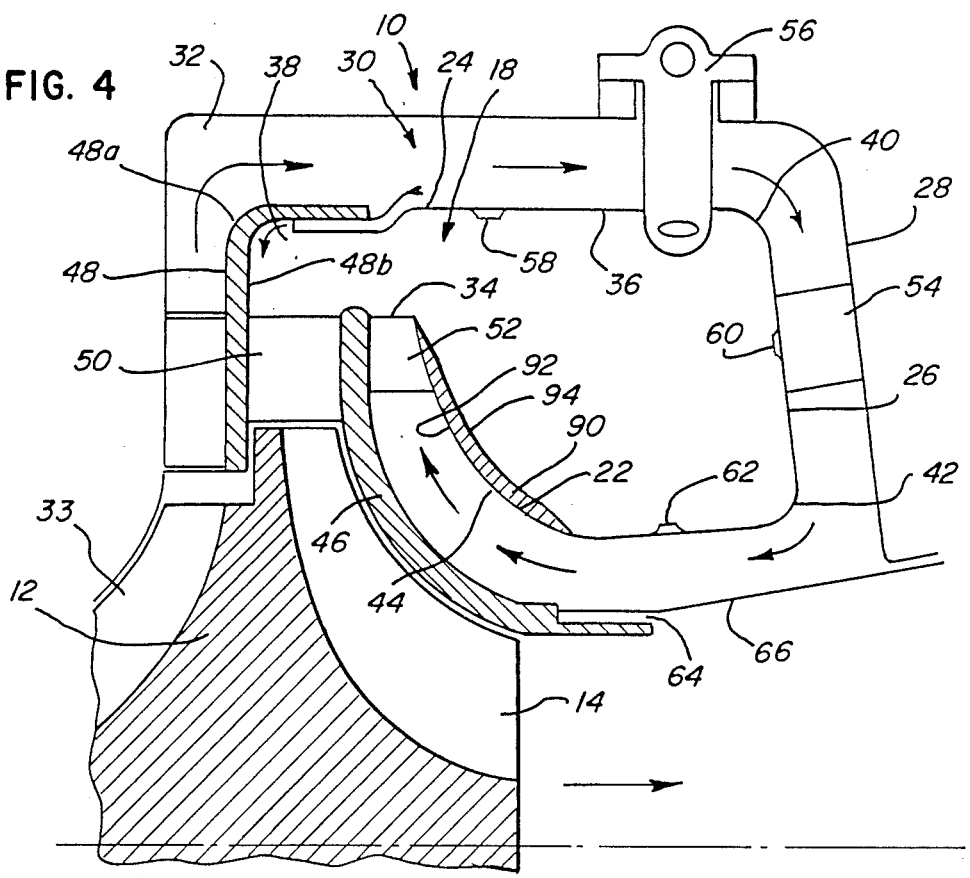

CONTAINMENT RING FOR RADIAL INFLOW TURBINE

CROSS REFERENCE

This application is a continuation-in-part of the commonly assigned, copending application Shekleton and Johnson entitled, "Gas Turbine Annular Combustor with Radial Dilution Air Injection" application Ser. No. 291,041 and filed on Dec. 28, 1988, now abandoned.

FIELD OF THE INVENTION

This invention relates to gas turbines and, more particularly, to a radial inflow turbine and a containment ring therefor.

BACKGROUND OF THE INVENTION

One concern in the operation of gas turbine engines is the catastrophic failure of any part of the turbine wheel including the hub, the blades, or both. Because such failures typically occur when the gas turbine is in operation, and because the rates of revolution of turbine wheels in gas turbines are quite high, the resultant high angular velocity translates to high centrifugal forces acting on the turbine wheel. Should there be a failure where any part or all of the turbine wheel cracks, breaks or begins to disintegrate during turbine operation, the presence of this high centrifugal force will cause the separated component to move radially outwardly at high velocity and with substantial kinetic energy.

To prevent damage to surrounding instrumentalities, it has long been common to provide turbines with so-called containment rings. Containment rings, generally of wrought metal, are disposed radially outwardly of the turbine wheel and to some degree, axially to each side of the turbine wheel. The containment rings are made of material with sufficient strength that upon catastrophic failure of a turbine wheel, all parts thereof moving radially outwardly will impinge upon the containment ring which in turn will halt and arrest any further radial outward movement thereof.

While strength is the main constraint in providing a containment ring for land based or marine gas turbines, in the case of airborne gas turbines, weight becomes a constraint as well. And of course, cost is always of concern.

It can be readily appreciated that the greater the radial spacing from the axis of rotation of the turbine wheel to the containment ring, the greater the mass of the turbine ring because its circumference will increase in relation to the radial distance. Thus, it is desirable in aircraft gas turbines to maintain the containment ring as close as possible to the turbine wheel rotational axis. This also reduces the cost of materials where the cost of the material used in fabricating the containment ring is a significant factor.

However, in so doing, the containment ring is brought closer and closer to those areas of the gas turbine that are exposed to high temperatures; and this in turn means that increasingly exotic material whose cost is a consideration must be used in order to withstand the high temperatures and thermal cycling in the environment in which they are placed and yet reliably provide containment. Consequently, high cost, wrought containment ring structures have been employed as a trade off to obtain minimal mass.

It has also long been known in gas turbine engines to provide a dilution air zone in the combustor. This zone is conventionally located directly within the combustion annulus downstream of the fuel injectors but well upstream of the outlet of the combustor. Generally speaking, dilution air is injected into the combustion annulus to control the temperature of hot gases.

More particularly, upstream of the dilution zone both fuel and air are injected and ignited in the combustion annulus. It is also conventional for there to be a cooling air film introduced along the walls of the combustion annulus upstream of the dilution zone. Of course, the hot gases that result from combustion then pass toward turbine blades.

As is known, it is important to be able to control the temperature of the hot gases as they enter the nozzle on their way to the turbine blades. This has conventionally been handled by means of a dilution zone within the combustion annulus well upstream of the outlet of the combustor in order to ensure mixing and cooling prior to entry into the nozzle. While effective, this means of controlling the temperature of the hot gases is not satisfactory in all respects.

More particularly, the need to provide a dilution zone in a combustion annulus upstream of the outlet of the combustor dictates the geometry. In other words, the length of the turbine has been controlled to a degree by the necessity of having a distinct dilution zone within the combustion annulus, i.e., there was no opportunity for shortening the length of the combustor in order to reduce weight and expense. However, conventional designs have also failed to address still another serious problem.

More specifically, the dilution air flow path is known to cool only a portion of the walls of the combustor. Thus, in a conventional annular combustor of a gas turbine, not only is it true that not all portions of the walls of the combustor are cooled, but the point of injection into the dilution zone has rendered it impossible to effect any significant cooling of the turbine shroud and, thus, of the nozzle and turbine blades. As a result, it has remained to provide a low cost, simple, reliable turbine shroud cooling.

As will be appreciated, these problems lead to adverse consequences on performance and life span. In other words, due to the heretofore recognized inability to provide an ultra-short combustor and a well-cooled turbine shroud, it has been impossible to achieve the highest levels of power and fuel economy as well as longer life for the various components such as the nozzle blade, turbine shroud, turbine blades, turbine exhaust duct, etc. Furthermore, if an ultra-short combustor could be provided, there would be less exhaust noise thereby reducing silencing problems.

In the previously identified copending application, a means of achieving such advantageous cooling is disclosed. According to the present invention, such advantageous cooling means are also employed to overcome the above-stated problem incurred in fabricating gas turbine containment rings of low mass.

SUMMARY OF THE INVENTION

It is a principal object of the invention to provide a new and improved containment structure for a gas turbine. More specifically, it is an object of the invention to provide such a containment structure at a radially inner location where dilution air is injected radially downstream of a combustion annulus to provide cooling for the containment structure.

An exemplary embodiment of the invention achieves the foregoing objects in a gas turbine including a rotor having a radial inflow turbine wheel with turbine blades and a turbine nozzle assembly outwardly of the turbine blades. The nozzle is adapted to direct hot gases at the turbine blades to cause rotation of the rotor. An annular combustor is disposed about the rotor and has an outlet to the nozzle. The annular combustor has spaced inner and outer walls which in turn are connected by a generally radially extending wall opposite of the outlet. A housing substantially surrounds the annular combustor in spaced relation to the inner and outer and radial extending walls and defines a dilution air path including a radially outer, compressed air inlet in communication with the compressor supplying dilution air at one end thereof and a radially inner dilution air outlet in communication with the annular combustor adjacent the outlet therefrom at the opposite end thereof. The dilution air flow path extends substantially entirely about the annular combustor to cool the inner, outer and radial extending walls thereof. The invention includes a containment ring that at least is partially about the turbine wheel and is in or abuts the dilution air flow path just upstream of the compressed air outlet.

This construction allows the containment ring to be located at an extremely radially inner position so as to minimize its mass. At the same time, it need not necessarily be formed of exotic materials because it is exposed to the dilution air stream and is thus cooled thereby.

In a highly preferred embodiment, the containment ring is made of a cast metal to minimize fabrication expense.

According to one embodiment of the invention, the containment ring forms part of the inner wall of the combustor.

According to another embodiment of the invention, the containment ring is spaced from both the housing and the annular combustor to be somewhat centrally located within the dilution air path.

In still another embodiment of the invention, and a highly preferred embodiment at that, the housing includes a rear shroud for the turbine wheel and the containment ring is part of the shroud. In a highly preferred embodiment, the shroud mounts the containment ring on the radially outer side thereof.

Other objects and advantages will become apparent from the following specification taken in connection with the accompanying drawings.

DESCRIPTION OF THE DRAWINGS

FIG. 3 is a view similar to FIGS. 1 and 2 but showing still another modified embodiment; and FIG. 4 is a view similar to FIGS. 1 and 3 but showing still another modified embodiment.

DESCRIPTION OF THE PREFERRED EMBODIMENTS

Figure 1:
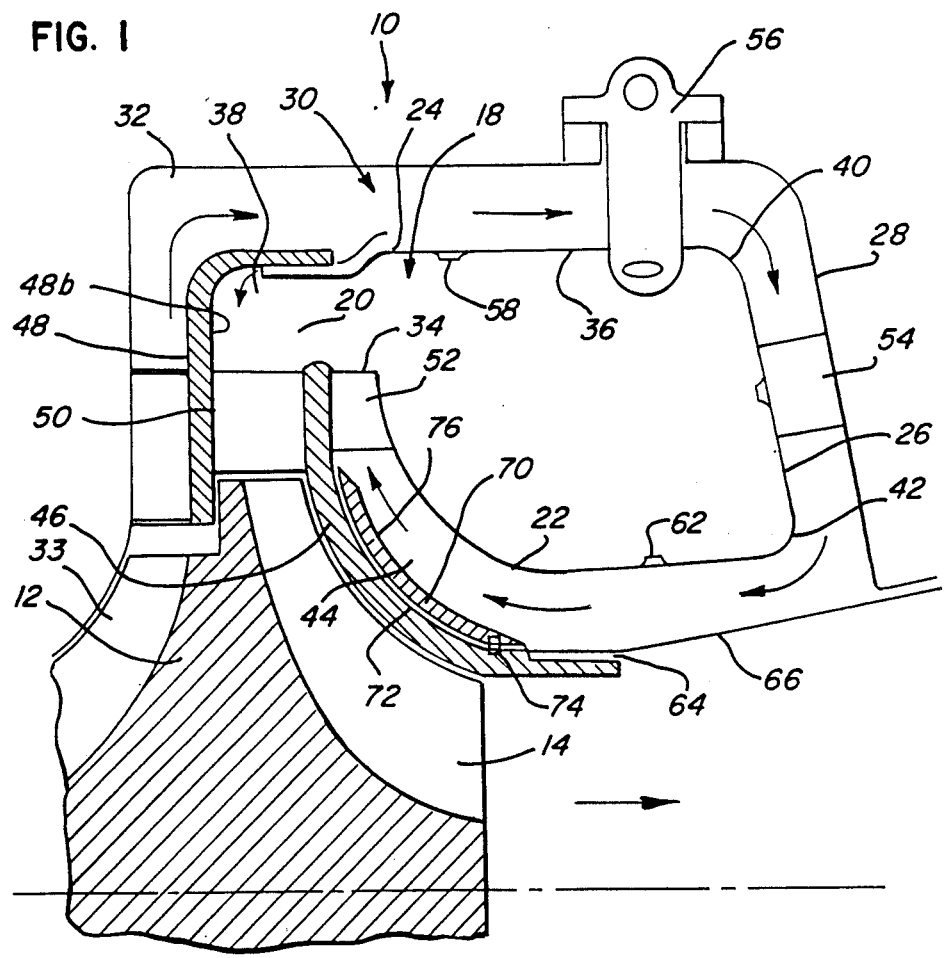
FIG. 1 is a somewhat schematic, fragmentary, sectional view of a gas turbine illustrating one embodiment of the invention.

Exemplary embodiments of a gas turbine constructed in accordance with the invention are illustrated in the drawings. Referring to FIG. 1, the reference numeral 10 designates generally a gas turbine shown herein for illustration purposes as being of the radial inflow type and having a rotor 12 defining a radial inflow turbine wheel with turbine blades 14 and a nozzle 16 adapted to direct hot gases at the turbine blades 14 to cause rotation of the rotor 12. In addition, the gas turbine 10 includes an annular combustor generally designated 18 about the rotor 12 and having an outlet 20 to the nozzle 16, spaced inner and outer walls 22 and 24, respectively, and a generally radially extending wall 26 connecting the inner and outer walls 22 and 24 opposite of the outlet.

A housing 28 substantially surrounds the annular combustor 18 in spaced relation to the inner, outer and radially extending walls 22,24 and 26, respectively, to define a dilution air flow path generally designated 30. The dilution air flow path 30 includes a compressed air inlet as at 32 in communication with a rotary compressor 33 supplying dilution air at one end thereof and a dilution air outlet 34 in communication with the annular combustor 18 adjacent the outlet 20 at the other end thereof As will be seen, the dilution air flow path 30 extends substantially entirely about the annular combustor 18 to cool the inner, outer and radially extending walls 22, 24 and 26, respectively and such that the vast majority of the compressed air supplied by the compressor 33 which is not used as bleed air or to support combustion travels all the way to the dilution air outlet 34.

Moreover, the dilution air flow path 30 extends first along the outer wall 24 and then along the radially extending wall 26 and finally along the inner wall 22 of the annular combustor 18 (see the arrows showing the direction of flow); and in a highly preferred embodiment, has a high swirl.

As will be appreciated, the annular combustor 18 includes a combustion annulus 36 defined by the inner, outer and radially extending walls 22,24 and 26, respectively. This combustion annulus 36 is disposed upstream of the outlet 20 of the annular combustor 18 and, as a result, the compressed air outlet 34 is in communication with the annular combustor 18 downstream of the combustion annulus 36 closely adjacent the nozzle 16. Furthermore, as shown, a dilution zone annulus 38 is disposed between the combustion annulus 36 and the nozzle 16 in the outlet region of the annular combustor 18.

In other words, the outlet 20 of the annular combustor 18 leads to the nozzle 16 through the dilution zone annulus 38. Thus, all of the hot gases exiting from the combustion annulus 36 pass through the dilution annulus 38 where dilution air is injected into the hot gases from the dilution air outlet 34 prior to entry into the nozzle 16. For this reason, the hot gases are cooled by and mixed with the dilution air thoroughly thereby protecting the downstream components.

As shown in the drawings, the dilution air flow path 30 defines what could merely be termed a near closed loop although it is not a closed loop in the true sense of the word since the compressed air outlet 34 is spaced from the outer wall 24. Nevertheless, the configuration defined by the inner, outer and radially extending walls 22,24 and 26, respectively, does include bends as at 40, 42 and 44 which help to define the near closed loop configuration of the dilution air flow path 30 which extends substantially entirely about the large combustion annulus 36. As for the combustion annulus 36, it leads in a downstream direction to the outlet 20 which is greatly reduced in cross sectional area relative thereto and the dilution air outlet 34 directs the dilution air radially outwardly toward the outer wall 24 and across the outlet 20 of the annular combustor 18.

As previously mentioned, the dilution air flow path 30 extends from the compressed air inlet 32 substantially entirely about the combustion annulus 36 to the dilution air outlet 34. It will be seen from the drawings that the compressed air inlet 32 and dilution air outlet 34 are at remote ends of the dilution air flow path 30, although the compressed air outlet 34 does in fact direct dilution air from the flow path in a direction generally toward the compressed air inlet 32 by reason of the nearly closed loop path followed by the dilution air. With the arrangement illustrated in the drawing, as much as approximately 40% of the total air flow enters the combustor 18 at the dilution air outlet 34.

In another manner of speaking, the dilution air outlet 34 advantageously directs the dilution air from the dilution air flow path 30 in a direction generally back toward the compressed air inlet 30. It will be appreciated that this is a radially outwardly directed injection of the dilution air toward the outer wall 24 and across or generally parallel to the outlet 20 of the annular combustor 18 which helps achieve thorough mixing and cooling of the hot gases from the combustion annulus 38 moving at generally a right angle thereto. Preferably, mixing and cooling of dilution air and hot gases in the dilution zone is enhanced by utilizing means for inducing swirl into the dilution air as will be described in greater detail hereinafter.

As shown in the drawings, the housing 28 preferably also includes a pair of spaced apart rear and front turbine nozzle shrouds 46 and 48, respectively, enclosing the turbine blades 14 and mounting the nozzle blades 50 in the nozzle area 16. These turbine shrouds 46 and 48, together with the remainder of the housing 28 and the inner, outer and radially extending walls 22, 24 and 26, respectively, define the entirety of the dilution air flow path 30 in the preferred embodiment. As will be appreciated, a portion of the dilution air flow path 30 extends along the turbine shroud 46.

In the preferred embodiment, means are provided for inducing swirl into the dilution air as discussed hereinafter which can advantageously take the form of standoff swirl vanes at 52 in the dilution air outlet 34 and/or alternatively swirl vanes 54 at any point along the dilution air flow path 30. In any case, the swirl blades 50 and/or 52 are provided for achieving a thorough mixing of the dilution air with the hot gases directed toward the turbine blades 14 by the nozzle blades 50. In other words, by introducing swirl into the dilution air prior to injection into the dilution annulus 38, annulus 38, thorough mixing can be achieved in an area of significantly reduced cross section in relation to the cross sectional area of the combustion annulus 36.

As shown in the drawing, the annular combustor 18 will preferably include a plurality of radially disposed fuel injectors 56 which and serve to spray fuel into the combustion annulus 36 where it will be burned to produce the hot gases. It is these gases that are mixed with the dilution air in the dilution annulus 38 prior to entry into the nozzle 16 and contact with the nozzle blades 50 and, alternately, the turbine blades 14. Furthermore, the gas turbine 10 may include small openings as illustrated schematically, for instance, at 58, 60 and 62 to inject air into the combustion annulus 36 to produce a localized air film on the inwardly facing surfaces of the inner, outer and radially extending walls 22, 24 and 26, respectively.

By reason of the unique swirl cooling and dilution air mixing, the annular combustor 18 can be formed to have far less length than in a conventional combustor. It will also be appreciated that the turbine nozzle shrouds 46 and 48 are well cooled by the design of the present invention which achieves much higher power and greater fuel economy than for comparable gas turbines. In essence, the dilution zone of a conventional combustor has been entirely eliminated by locating it between the outlet 20 of the combustor 18 and the nozzle 16.

By so doing, the combustor 18 is shorter, lighter and less expensive resulting in reduced exhaust noise to eliminate silencing problems normally encountered. The combustor is also well cooled because of its reduced surface area and higher convective cooling and the rear shroud 46 is similarly well cooled which permits much closer tolerances for higher turbine efficiency and reduced fuel consumption, and the more uniform temperatures in the shroud assembly result in longer life. Furthermore, the nozzle blades 50, nozzle/exhaust duct seal 64 and exhaust duct 66 are all maintained at lower temperatures to insure a longer life.

The dilution air is preferably a high swirl flow, e.g., up to approximately 80°, at high Mach Nos., as it passes through the dilution air flow path 30. The dilution air is thus ejected while swirling at high Mach Nos. immediately upstream of the nozzle 16 and, due to the high preswirl, it is possible to use shorter, better cooled nozzle blades 50. Also, due to the high Mach Nos., it is possible to utilize larger, less expensive openings 58, 60 and 62 for the introduction of film air due to the lower value of $C_d$.

The extremely effective cooling provided by the just described structure not only provides the advantages mentioned above. According to the present invention, it provides a means whereby a cool running containment structure may be utilized.

With reference to FIG. 1, an annular containment ring 70, having the cross section illustrated is disposed within the dilution air flow path 30 just upstream of the outlet 34 and blades 50. The containment ring 70 includes a first surface 72 in abutment with the rear shroud 46 and may be mounted thereto as by pins or fasteners 74, one of which is shown in FIG. 1. As a result of this construction, the dilution air passing through the passage 30 on its way to the outlet 34, impinges upon a surface 76 of the containment ring 70 opposite the surface 72 to cool the ring 70. Preferably, the ring 70 will be made of a metal and will have good thermal conductivity so that it will conduct heat from the rear shroud 46 for exchange with the dilution air.

Because the invention allows the ring 70 to run so cool during operation, it need not necessarily be formed of wrought metals or other exotic materials as has heretofore been required. Rather, the ring 70 may be cast and thus fabricated at a fraction of the cost of conventional containment rings. Further, the ring 70 is thus located at the most radially inner position possible, thereby bringing its mass to an absolute minimum. At the same time, the ring 70 may be removed where the engine application does not require containment.

Figure 2:
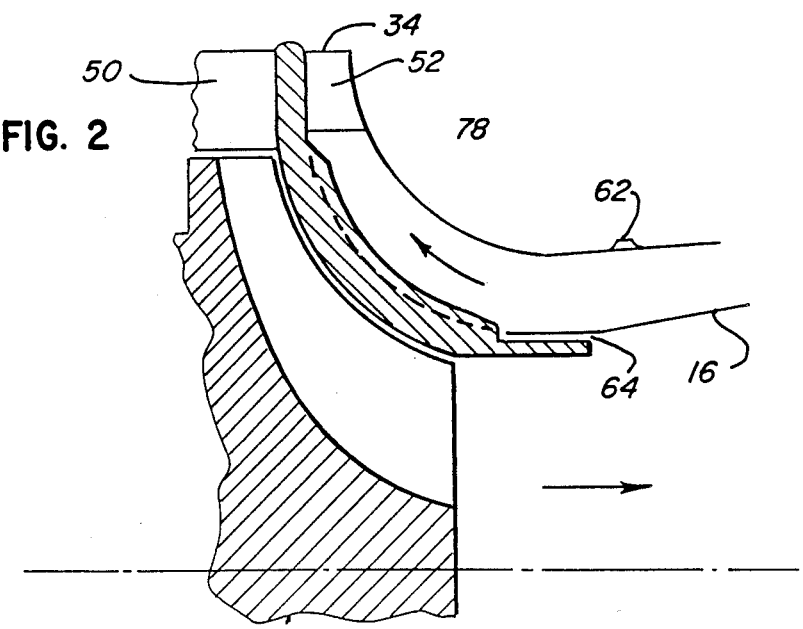
FIG. 2 is a fragmentary view similar to FIG. 1 but showing a first modified embodiment.

In some cases the ring 70 may be integral with the rear shroud 46 as shown in FIG. 2. According to one such embodiment, the thickness of the shroud 46 is increased in the area designated by the dotted line 78.

Referring to FIG. 3, the invention contemplates that in some instances, a containment ring such as shown at 80, be spaced somewhat from the rear shroud 46 so as to have opposed surfaces 82 and 84 fully within the dilution air stream. A series of standoffs shown schematically at 86 may be utilized to support the containment ring 80 at the location illustrated whereat it is spaced from both the radially outer surface of the rear shroud 46 as well as the wall 22. Again, the ring 80 is located just outwardly of the turbine blades 14 and is disposed just upstream of the outlet 34 and the vanes 52.

According to still another embodiment of the invention illustrated in FIG. 4, a containment ring 90 may form part of the inner wall 22 of the combustor 18 itself. Again, the containment ring 90 is just outwardly of the blades 14. In this case, the containment ring 90 has a radially inner surface 92 defining one side of the dilution air path 30 and an opposite side 94 forming an interior surface of the combustor 18.

In the case of the embodiments of FIGS. 1, 2, 3 and 4, cast metals may be advantageously employed in forming the ring structures.

Generally speaking, the embodiments of FIGS. 1 and 2 are favored in that they locate the containment ring as radially inwardly as possible thus reducing the overall mass of the ring and yet provides for adequate cooling so that nonexotic materials may be employed in its fabrication. The embodiments of FIGS. 3 and 4 retain the feature of excellent cooling and the ability to fabricate with low cost materials but will have somewhat greater mass than the embodiments of FIGS. 1 and 2.

It should also be noted that the invention is not limited to turbines having a dilution air path as the path 30 that extends substantially entirely about the combustor. Rather it is only necessary that some means for directing cooling air onto the rear shroud be employed to achieve the benefits of the invention.

While in the foregoing there has been set forth a preferred embodiment of the invention, it will be understood that the details herein given are for purposes of illustration and the invention is only to be limited by the spirit and scope of the appended claims.

I claim:

1. A gas turbine, comprising:
   a rotor including a radial inflow turbine wheel having blades and a nozzle outwardly of said turbine blades, said nozzle being adapted to direct hot gases at said turbine blades to cause rotation of said rotor;
   an annular combustor about said rotor and having an outlet to said nozzle, said annular combustor having spaced inner and outer walls, said inner and outer walls being connected by a generally radially extending wall;
   a housing substantially surrounding said annular combustor in spaced relation to said inner, outer and radially extending walls thereof, said housing defining a dilution air flow path including a radially outer compressed air inlet in communication with a compressor supplying dilution air at one end thereof and a radially inner dilution air outlet in communication with said annular combustor adjacent said outlet at the other end thereof, said dilution air flow path extending substantially entirely about said annular combustor to cool said inner, outer and radially extending walls thereof; and
   a containment ring at least partially about said turbine wheel and on or abutting said dilution air flow path just upstream of said dilution air outlet.

2. The gas turbine as defined in claim 1 wherein said dilution air flow path extends first along said outer wall and then along said radially extending wall and finally along said inner wall of said annular combustor and said containment ring is part of said inner wall of said combustor.

3. The gas turbine of claim 1 wherein said containment ring is spaced from both said housing and said annular combustor.

4. The gas turbine of claim 1 wherein said housing includes a rear shroud for said turbine wheel and said containment ring is part of said shroud.

5. The gas turbine of claim 4 wherein said shroud mounts said containment ring on the radially outer side thereof.

6. A gas turbine, comprising:
   a rotor including a turbine wheel having blades and a nozzle adjacent said turbine blades, said nozzle being adapted to direct hot gases at said turbine blades to cause rotation of said rotor;
   an annular combustor about said rotor defined by spaced inner and outer walls connected by a generally radially extending wall, said annular combustor having an outlet leading to said nozzle, said annular combustor also including a combustion annulus defined by said inner, outer and radially extending walls upstream of said outlet;
   a housing including a rear turbine wheel shroud substantially surrounding said annular combustor in spaced relation to said inner, outer and radially extending walls thereof, said housing and walls together defining a dilution air flow path extending from a compressed air inlet to a radially inner dilution air outlet where said compressed air inlet is in communication with a source of dilution air and said dilution air outlet is in communication with said annular combustor adjacent said outlet at the end of said dilution air flow path remote from said compressed air inlet, said dilution air flow path extending first along said outer wall and then along said radially extending wall and finally along said inner wall of said annular combustor; said dilution air flow path extending from said compressed air inlet substantially entirely about said combustion annulus to said dilution air outlet; and
   a containment ring in said dilution air flow path adjacent said dilution air outlet and aligned with said shroud.

7. The gas turbine of claim 6 wherein said containment ring is mounted on said shroud oppositely of said turbine wheel.

8. The gas turbine of claim 6 wherein said containment ring is spaced radially outwardly of said shroud.

9. The gas turbine of claim 6 wherein said containment ring is made of cast metal.

10. A gas turbine, comprising:
    a rotor including a radial inflow turbine wheel having blades and a nozzle outwardly of said turbine blades, said nozzle being adapted to direct hot gases at said turbine blades to cause rotation of said rotor;
    an annular combustor about said rotor and having an outlet to said nozzle, said annular combustor having spaced inner and outer walls, said inner and outer walls being connected by a generally radially extending wall;
    a rear turbine shroud opposite of said radially extending wall and in close proximity to said turbine wheel blades;
    means defining a confined dilution air flow path along at least a portion of said shroud oppositely of said turbine wheel blades and in communication with a compressor supplying dilution air at one end thereof to cool said shroud; and a containment ring at least partially about said turbine wheel and on or abutting said dilution air flow path in the vicinity of said shroud to be cooled by dilution air cooling said shroud.

11. The gas turbine of claim 10 wherein said containment ring is integral with said shroud.

12. The gas turbine of claim 10 wherein said containment ring is mounted on and in abutment with said shroud.

* * * * *